(12) United States Patent
Nomizo

(10) Patent No.: US 8,233,002 B2
(45) Date of Patent: Jul. 31, 2012

(54) IMAGE TRANSFER APPARATUS AND IMAGE TRANSFER METHOD

(75) Inventor: Tomohiro Nomizo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 973 days.

(21) Appl. No.: 12/243,521

(22) Filed: Oct. 1, 2008

(65) Prior Publication Data

US 2009/0086168 A1     Apr. 2, 2009

(30) Foreign Application Priority Data

Oct. 2, 2007  (JP) ................. 2007-259057

(51) Int. Cl.
*G09G 5/399* (2006.01)
*G06F 3/00* (2006.01)

(52) U.S. Cl. .......................... 345/531; 715/700
(58) Field of Classification Search .................. None
See application file for complete search history.

(56) References Cited

U.S. PATENT DOCUMENTS

| | | | |
|---|---|---|---|
| 5,634,018 A * | 5/1997 | Tanikoshi et al. ............. 715/751 |
| 6,411,302 B1 * | 6/2002 | Chiraz ......................... 345/545 |
| 7,477,205 B1 * | 1/2009 | de Waal et al. ................ 345/1.3 |
| 7,523,402 B2 | 4/2009 | Kunisada | |
| 2005/0264589 A1 * | 12/2005 | Kimoto et al. ................ 345/698 |
| 2006/0048058 A1 * | 3/2006 | O'Neal et al. ................. 715/730 |
| 2008/0162725 A1 * | 7/2008 | Kambhatla .................... 709/245 |

FOREIGN PATENT DOCUMENTS

| | | |
|---|---|---|
| JP | 01-158527 A | 6/1989 |
| JP | 09-128178 A | 5/1997 |
| JP | 11-134161 A | 5/1999 |
| JP | 2000-339130 A | 12/2000 |
| JP | 2007-240813 A | 9/2007 |
| WO | WO-02-067102 A | 8/2002 |

* cited by examiner

*Primary Examiner* — Kee M Tung
*Assistant Examiner* — Carlos Perromat
(74) *Attorney, Agent, or Firm* — AdvantEdge Law Group, LLC

(57) ABSTRACT

An image transfer apparatus includes a display configured to display multiple sets of content. A display image data generator is configured to generate display image data for each of the content, at least part of the content being displayed on the display. A storage controller is configured to relate connected image projection apparatus to the generated display image data and store the display image data related to the image projection apparatus in a storage device. A transfer unit is configured to transfer the display image data to the corresponding image projection apparatus.

17 Claims, 9 Drawing Sheets

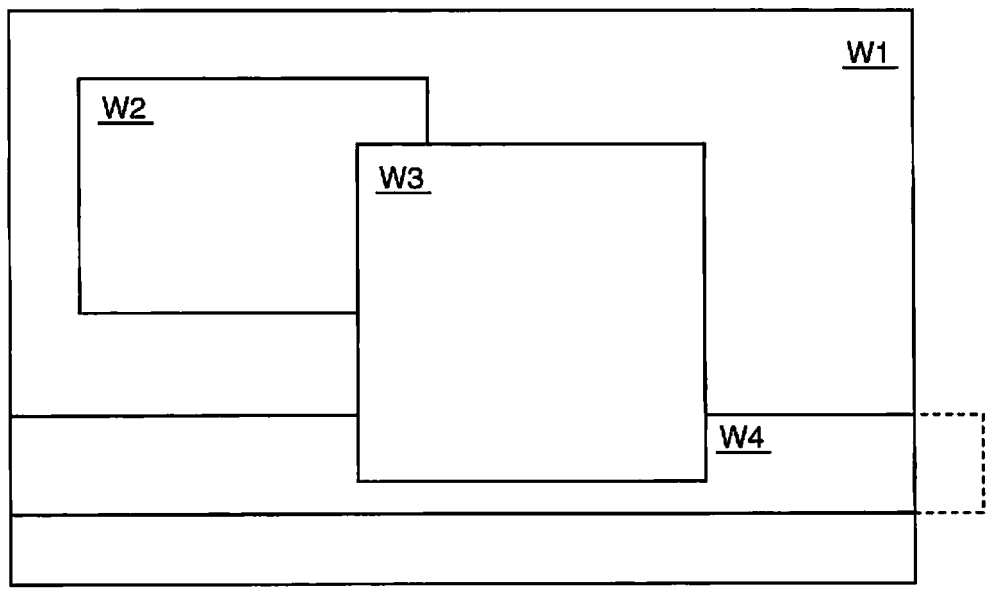
FIG. 5
FIG. 6
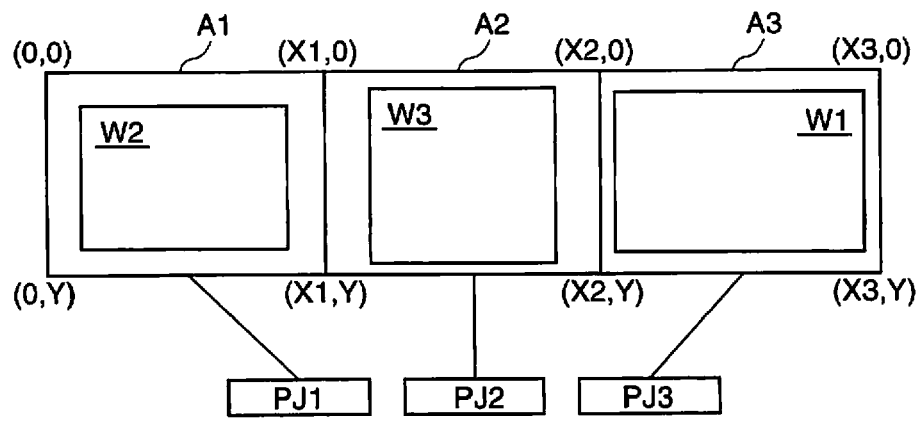
FIG. 7

| PROJECTOR | WINDOW | STORAGE AREA |
|---|---|---|
| PJ1 | W4 | A1 |
| PJ2 | W4 | A2 |
| PJ3 | W2 | A3 |
| PJ4 | — | A4 |

| PROJECTOR TRANSFER STORAGE AREA | WINDOW | STORAGE AREA FOR STORING DISPLAY IMAGE DATA |
|---|---|---|
| SPJ1 | W1 | A3 |
| SPJ2 | W2 | A1 |
| SPJ3 | W3 | A2 |

IMAGE TRANSFER APPARATUS AND IMAGE TRANSFER METHOD

CROSS-REFERENCE TO RELATED APPLICATIONS

The present application claims priority from Japanese Patent Application No. 2007-259057 filed on Oct. 2, 2007, which is hereby incorporated by reference in its entirety.

BACKGROUND

An image projection apparatus, which projects content for presentations or other purposes on a projection screen, may be connected to an image transfer apparatus, for example, a personal computer. An image transfer apparatus of related art generates display image data by regarding the display screen of a display device as a unit and uses the generated display image data to display an image on the display device. Therefore, when an image projection apparatus is used to display the image displayed on the display device, the display image data may be transferred to the image projection apparatus. As such, it may be difficult to satisfy a need to display part of the content on the display screen, for example, only the content that a presenter is presenting.

In contrast to the above method, there is a technique in which a mouse pointer may be used to select any of a plurality of windows displayed on a display device and window data of the selected window may be outputted to an external monitor, as referred to in Japanese Patent Publication No. JP-A-2000-339130.

However, when a plurality of image projection apparatus are connected to an image transfer apparatus, multiple sets of content displayed on the display device may not be transferred to respective desired image projection apparatus. Further, for the content part of which is displayed on the display device, the entire content may not be projected through an image projection apparatus.

The challenges described above may not be limited to an image transfer apparatus to which a plurality of image projection apparatus are connected, but common to an image transfer apparatus to which a plurality of external display devices are connected.

SUMMARY

An image transfer apparatus and method for controlling an image transfer apparatus have been developed in response to the current state of the art, and in particular, in response to these and other problems, needs, and demands that have not been fully or completely solved by currently available devices. More specifically, various embodiments described in the disclosure provide an image transfer apparatus and method for controlling an image transfer apparatus which may project desired content among multiple sets of content on a display screen to respective multiple image projection apparatus.

One embodiment provides an image transfer apparatus to which a plurality of image projection apparatus can be connected. One embodiment includes a display capable of displaying multiple sets of content, a display image data generator that generates display image data for each content at least part of which is displayed on the display, a storage device, a storage controller that relates the connected image projection apparatus to the generated display image data and stores the display image data related to the image projection apparatus in the storage device, and a transfer unit that transfers the display image data to the corresponding image projection apparatus.

In certain embodiments, the generated display image data are related to the connected image projection apparatus and stored in the storage device, and display image data are transferred to the corresponding image projection apparatus. Therefore, among the multiple sets of content on the display screen, desired sets of content can be projected to a plurality of image projection apparatus.

An embodiment may further include a selector that selects any one of the multiple sets of content displayed on the display, and a specifying unit that specifies an image projection apparatus for projecting the selected content. The storage controller may relate the selected display image data to the specified image projection apparatus and store the display image data related to the specified image projection apparatus in the storage device. In this example, the selected content may be related to the specified image projection apparatus.

In one embodiment, the storage controller may reserve storage areas for storing the display image data in the storage device in accordance with the number of content displayed on the display. In this example, by relating the storage areas that store the multiple sets of content displayed on the display to the image projection apparatus, desired sets of content may be projected to a plurality of image projection apparatus. Further, the storage controller may reserve storage areas for storing the display image data in the storage device in accordance with the number of connected image projection apparatus. In this example, desired sets of content may be projected to a plurality of image projection apparatus by transferring the display image data from the storage areas related to the plurality of image projection apparatus to the image projection apparatus.

At least one embodiment may further include an image processor that performs image processing on the display image data in the display image data storage areas according to the number of content. In this example, desired image processing may be performed for each content. Alternatively, certain embodiments may further include an image processor that performs image processing on the display image data in the display image data storage areas according to the number of image projection apparatus. In this example, desired image processing may be performed for each of the image projection apparatus.

In at least one embodiment, the storage controller may reserve the storage areas in the storage device in accordance with the resolution of the display. In this example, display image data may be stored while the resolution of the display is maintained. Alternatively, the storage controller may reserve the storage areas in the storage device in accordance with the resolution of the image projection apparatus. In this example, display image data according to the resolution of the image projection apparatus may be stored.

In certain embodiments, the storage areas are reserved in accordance with the arrangement of the connected image projection apparatus. When the amount of the display image data is larger than the capacity of any one of the storage areas, the storage controller may store the display image data in a plurality of storage areas that correspond to the image projection apparatus adjacent to each other. In this example, display image data for a window, part of which is displayed on the display, may be stored across a plurality of storage areas; and a plurality of image projection apparatus can be used to project the window.

One embodiment may further include a management unit that manages information on the connected image projection apparatus, and the storage controller may acquire information on the number of the connected image projection apparatus from the management unit. In this example, the information on the number of connected image projection apparatus may be readily acquired.

At least one embodiment provides an image transfer method. An embodiment may include generating display image data of each content at least part of which is displayed on a display, relating connected image projection apparatus to the generated display image data and storing the display image data related to the image projection apparatus in a storage device, and transferring the display image data to the corresponding image projection apparatus.

Certain embodiments may be implemented in the form of a computer program or software (e.g., recorded on a computer-readable medium, such as a CD, DVD, and HDD).

BRIEF DESCRIPTION OF THE DRAWINGS

Embodiments of the disclosure are described with reference to the accompanying drawings, wherein like numbers refer to like elements.

FIG. 5 is a descriptive diagram illustrating an example of the screen on a display where a plurality of windows are displayed.

FIG. 6 is a descriptive diagram illustrating memory areas in a RAM that stores display image data of each of the windows shown in FIG. 5.

FIG. 7 is a descriptive diagram illustrating an example of a table that stores the relationship between projectors and windows.

DESCRIPTION OF EMBODIMENTS

Figure 1:
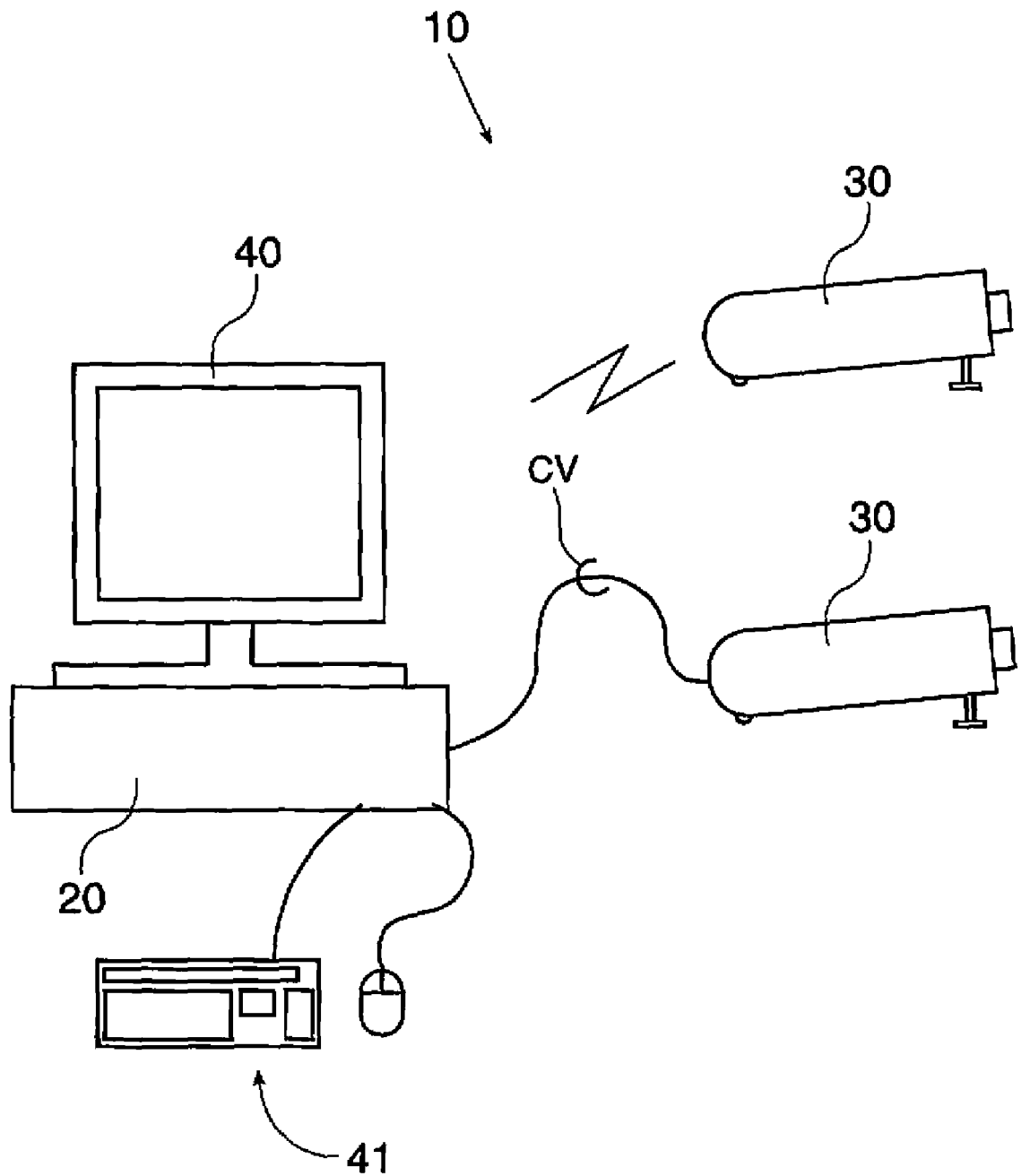
FIG. 1 is a descriptive diagram illustrating a schematic configuration of an image transfer system including an image transfer apparatus according to at least one embodiment.

In the following description, reference is made to the accompanying drawings which form a part hereof, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure may be defined by the appended claims and their equivalents.

Throughout the specification and claims, the following terms take at least the meanings explicitly associated herein, unless the context clearly dictates otherwise. The meanings identified below are not intended to limit the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The meaning of "in" may include "in" and "on." The appearances of the phrases "in one embodiment" or "in an embodiment" in various places in the specification do not necessarily all refer to the same embodiment, but it may.

As used herein, the term "software" refers broadly to any set of computer readable instructions embodied on one or more computer readable media, the instructions being executable by a computing device. Software may include one or more computer programs or applications. Data related to software may include configuration data such as file system and registry data associated with the software, including data representative of file system and configuration activity associated with operation and/or installation of the software.

As used herein, the terms "processor", "generator", "controller", and "transfer unit" refer broadly to devices consisting of any set of circuits, general purpose processors (e.g., micro-processors, micro-controllers, an ASIC, or digital signal processors (DSPs)), special purpose processors (e.g., application specific integrated circuits or ASICs), firmware (e.g., firmware that is used by a processor such as a micro-processor, a micro-controller, and/or a digital signal processor), state machines, hardware arrays, reconfigurable hardware, and/or software made up of executable instructions configured to perform the action described. The executable instructions may be embodied in firmware logic, reconfigurable logic, a hardware description language, a state machine, an application-specific integrated circuit (ASIC), or combinations thereof. The appearances of each of these terms in various places in the specification do not necessarily all refer to the same embodiment of that device, but it may. Moreover, in various embodiments each "processor", "generator", "controller", and "transfer unit" device may share some common components with other devices in an image transfer apparatus.

An image transfer apparatus and an image transfer method according to embodiments of the disclosure will be described below with reference to the drawings. Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment.

Configuration of Image Transfer System

FIG. 1 is a descriptive diagram illustrating a schematic configuration of an image transfer system including an image transfer apparatus according to at least one embodiment. FIG.

Figure 3:
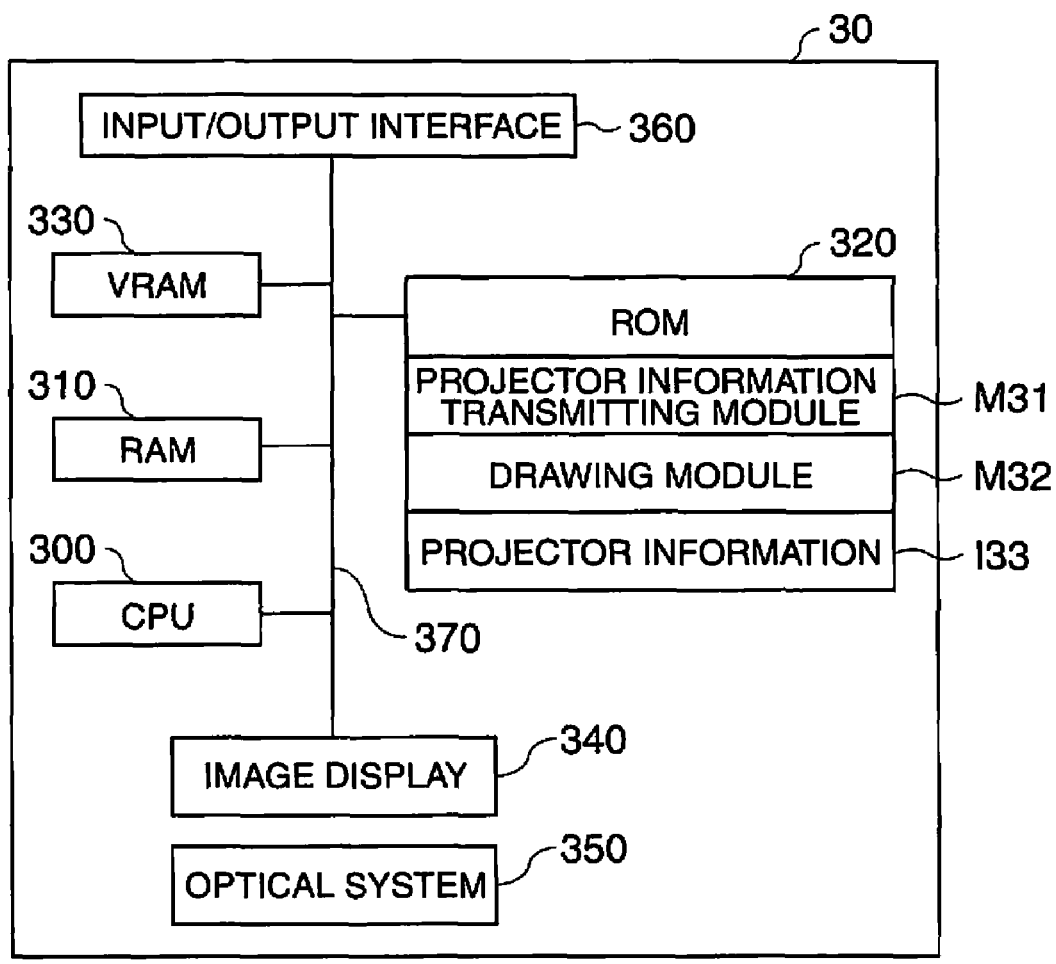
FIG. 3 is a functional block diagram illustrating an internal configuration of an image projection apparatus used in at least one embodiment.

2 is a functional block diagram illustrating an internal configuration of the image transfer apparatus according to at least one embodiment. FIG. 3 is a functional block diagram illustrating an internal configuration of an image projection apparatus used in at least one embodiment.

An image transfer system 10 includes an image transfer apparatus 20 and image projection apparatus 30. The image transfer apparatus 20 is connected to a plurality of image projection apparatus 30. The image transfer apparatus 20 is connected to each of the image projection apparatus 30, for example, via a universal serial bus (USB) cable CV and a wireless local area network (LAN).

Configuration of Image Transfer Apparatus

Figure 2:
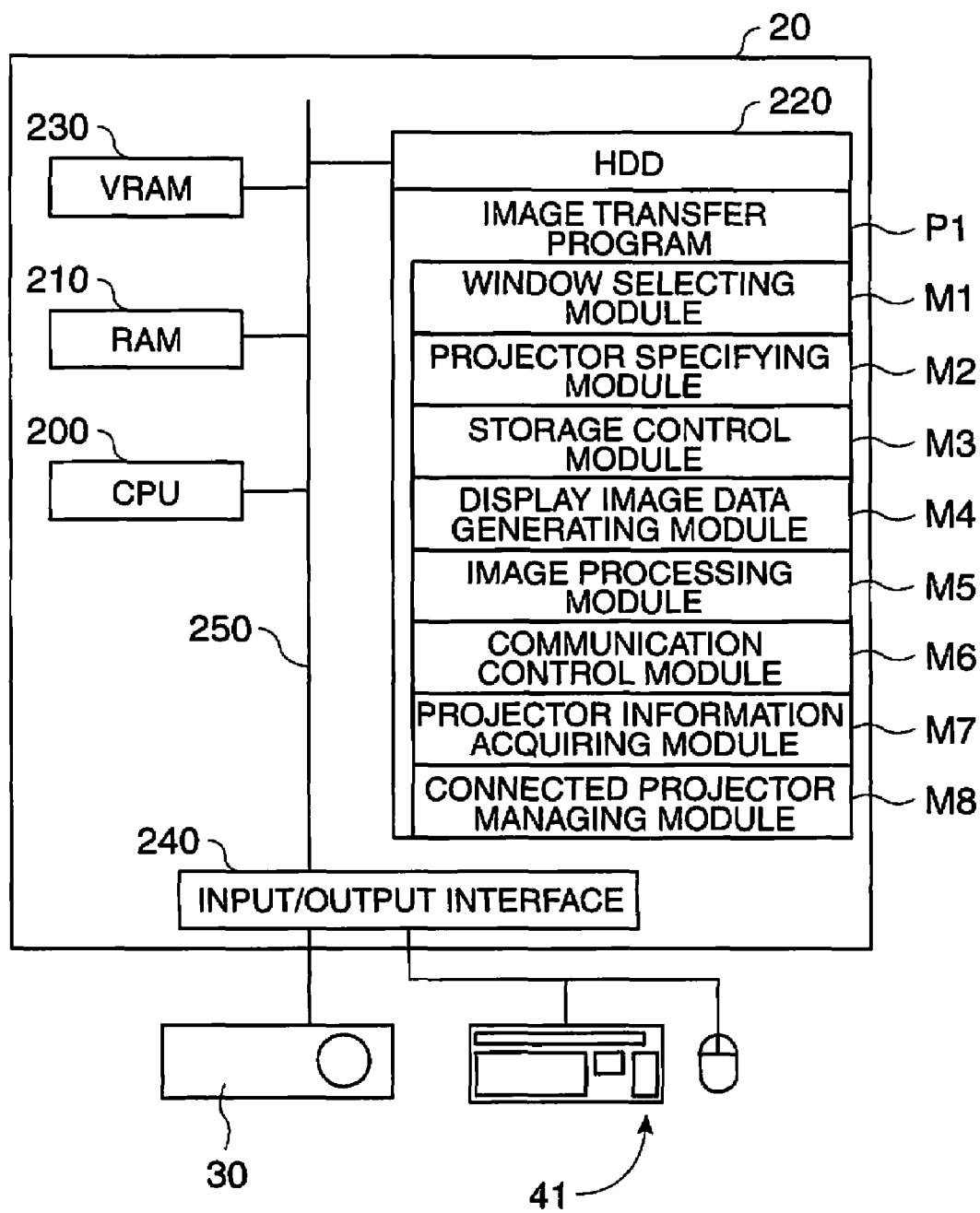
FIG. 2 is a functional block diagram illustrating an internal configuration of the image transfer apparatus according to at least one embodiment.

The image transfer apparatus 20 may be, for example, a personal computer and connected to a display 40 and an input device 41, such as a keyboard and a mouse. The image transfer apparatus 20 includes a central processing unit (CPU) 200, a random access memory (RAM) 210, a hard disk drive (HDD) 220, a video memory (VRAM) 230, and an input/output interface 240, as shown in FIG. 2. The CPU 200, RAM 210, HDD 220, VRAM 230 and input/output interface 240 are connected via a common bus 250 capable of bidirectional communication.

The CPU 200 may be a logic circuit that executes a variety of operations and, for example, executes a variety of programs and modules stored on the HDD 220 by allocating them in the RAM 210. The RAM 210 is a volatile memory and temporarily stores the results of operations performed by the CPU 200 and display image data to be transferred to the image projection apparatus 30. The VRAM 230 is a memory in which display image data, drawn based on the data, are expanded and temporarily buffered. The VRAM 230 can typically read and write data faster than the RAM 210.

The HDD 220 is a magnetic disk-type storage device that stores an image transfer program P1. The HDD 220 may be replaced with a non-volatile semiconductor memory. The image transfer program P1 stored on the HDD 220 includes a window selecting module M1, a projector specifying module M2, a storage control module M3, a display image data generating module M4, an image processing module M5, a communication control module M6, a projector information acquiring module M7, and a connected projector managing module M8. The modules perform their respective functions when executed by the CPU 200.

The image transfer program P1 transfers the image displayed on the display 40 connected to the image transfer apparatus 20 to external image output apparatus. More specifically, the image transfer program P1, in at least one embodiment, can transfer multiple sets of content displayed on the display 40 to respective image output apparatus on a content basis. The content used herein may be a display screen provided in each application program. Examples of the content include document creating screens in word processing software, presentation screens in presentation software, a playback screen for playing back moving-image content distributed in a streaming operation, and still image editing and displaying screens. A so-called desktop screen displayed as a background on the display 40 may also be an example of the content. The examples of the content described above are called, for example, windows when Windows® is used as the operating system, and content is therefore hereinafter also referred to as a "window."

The window selecting module M1, when executed, selects a desired window from a plurality of windows displayed on the display 40. Specifically, the window selecting module M1 identifies the window selected from a plurality of windows by an operator through the input device 41. For example, each of the windows may be recognized and the selected window may be identified by assigning unique numbers to the windows displayed (windows that are open) on the display 40.

The projector specifying module M2 specifies a projector (image projection apparatus) 30 that outputs the window selected by the window selecting module M1.

The storage control module M3 relates the selected window to the specified projector 30 and stores the relationship in the RAM 210. In accordance with the number of windows at least part of each of which is displayed on the display 40, the number of projectors 30 connected to the image transfer apparatus 20, and the maximum resolution of the display 40, the storage control module M3 reserves storage areas for storing display image data for the windows in the RAM 210. At least either the storage areas according to the number of windows or the storage areas according to the number of projectors 30 may be reserved in the RAM 210 or on the HDD 220.

The display image data generating module M4 generates display image data for the windows displayed on the display 40. For the windows present on the display 40, in other words, all the windows including a window hidden behind other windows and a window part of which lies off the display screen of the display 40 and hence is not displayed thereon, the display image data generating module M4 can generate display image data for the entirety of each of the windows. The above process is accomplished, for example, by temporarily drawing display image data in the VRAM 230 for the window in operation (active window) or other windows when selected and storing the drawn display image data at a predetermined location in the RAM 210. In this case, whenever a window other than the active window is selected, the display of the selected window can be updated by drawing the selected window. Alternatively, when the VRAM 230 has a large capacity, display image data for a plurality of windows may be stored in the VRAM 230.

The image processing module M5 performs a variety of image processing operations on display image data to be transferred to a projector 30. Examples of the image processing performed by the image processing module M5 include resolution conversion, sharpness, brightness adjustment, and color balance.

The communication control module M6 controls the input/output interface 240 to transfer display image data to a projector 30 or receive projector information from a projector 30.

The projector information acquiring module M7 acquires projector information I33 (see FIG. 3) from a projector 30. Examples of the projector information I33 include information on image playback characteristics of the projector, such as the maximum resolution that the projector supports, the color profile of the projector (ICC profile, for example), and recognition information for identifying the projector.

The connected projector managing module M8 manages the number of projectors 30 connected to the image transfer apparatus 20. That is, the connected projector managing module M8 manages connection and disconnection of the projectors 30 to and from the image transfer apparatus 20.

The input/output interface 240 allows the image transfer apparatus 20 to send and receive signals to and from an external apparatus, for example, the image projection apparatus 30 through wired or wireless connection. The input/output interface 240 has a USB cable connection terminal for wired connection, and a transceiver including an antenna and a switch for switching sending and receiving operations for wireless connection. Such a transceiver provides an antenna access point (AP) capability or a station (STA) capability by which transmission/reception signals are transmitted and received. The input/output interface 240 also receives an input signal from the input device 41, such as a keyboard and a mouse, and outputs display image data to the display 40.

Configuration of Image Projection Apparatus

The image projection apparatus 30 is, for example, a projector as described above. The projector 30 includes a central processing unit (CPU) 300, a random access memory (RAM) 310, a non-volatile memory (ROM) 320, a video memory (VRAM) 330, an image display 340, an optical system 350, and an input/output interface 360, as shown in FIG. 3. The CPU 300, RAM 310, ROM 320, VRAM 330, image display 340, and input/output interface 360 are connected via a common bus 370 capable of bidirectional communication.

The CPU 300 is a logic circuit that executes a variety of operations and, for example, executes a variety of programs and modules stored in the ROM 320 by allocating them in the RAM 310. The RAM 310 is a volatile memory and temporarily stores the results of operations performed by the CPU 300. The VRAM 330 is a memory for temporarily buffering drawing data drawn based on display image data.

The ROM 320 is a semiconductor memory that stores a projector information transmitting module M31, a drawing module M32, and projector information I33. The ROM 320 may be replaced with a magnetic disk-type storage device.

The projector information transmitting module M31 transmits stored projector information to the image transfer apparatus 20. For example, when the wired or wireless connection between a projector 30 and the image transfer apparatus 20 is established, the projector information transmitting module M31 acquires the stored projector information I33 and transfers the projector information I33 to the image transfer apparatus 20 through the input/output interface 360.

The drawing module M32 analyzes display image data received from the image transfer apparatus 20 through the input/output interface 360 and draws them on the VRAM 330. Specifically, the drawing module M32 analyzes the received display image data to acquire information, such as the number of colors, (horizontal and vertical) sizes, coordinates, and the image format, and uses the acquired information to assign pixel values onto the VRAM 330, for example, in a bitmap method.

The image display 340 uses the drawing data stored in the VRAM 330 to produce an image to be projected. Examples of the image display 340 may include an image display that uses a liquid crystal panel to modulate the light from RGB light sources and an image display that uses a digital micromirror device (DMD) for the modulation.

The optical system 350 is formed of a plurality of lenses, enlarges the image produced in the image display 340 to a desired size, and projects it on a projection surface.

Image Transfer Process

Figure 4:
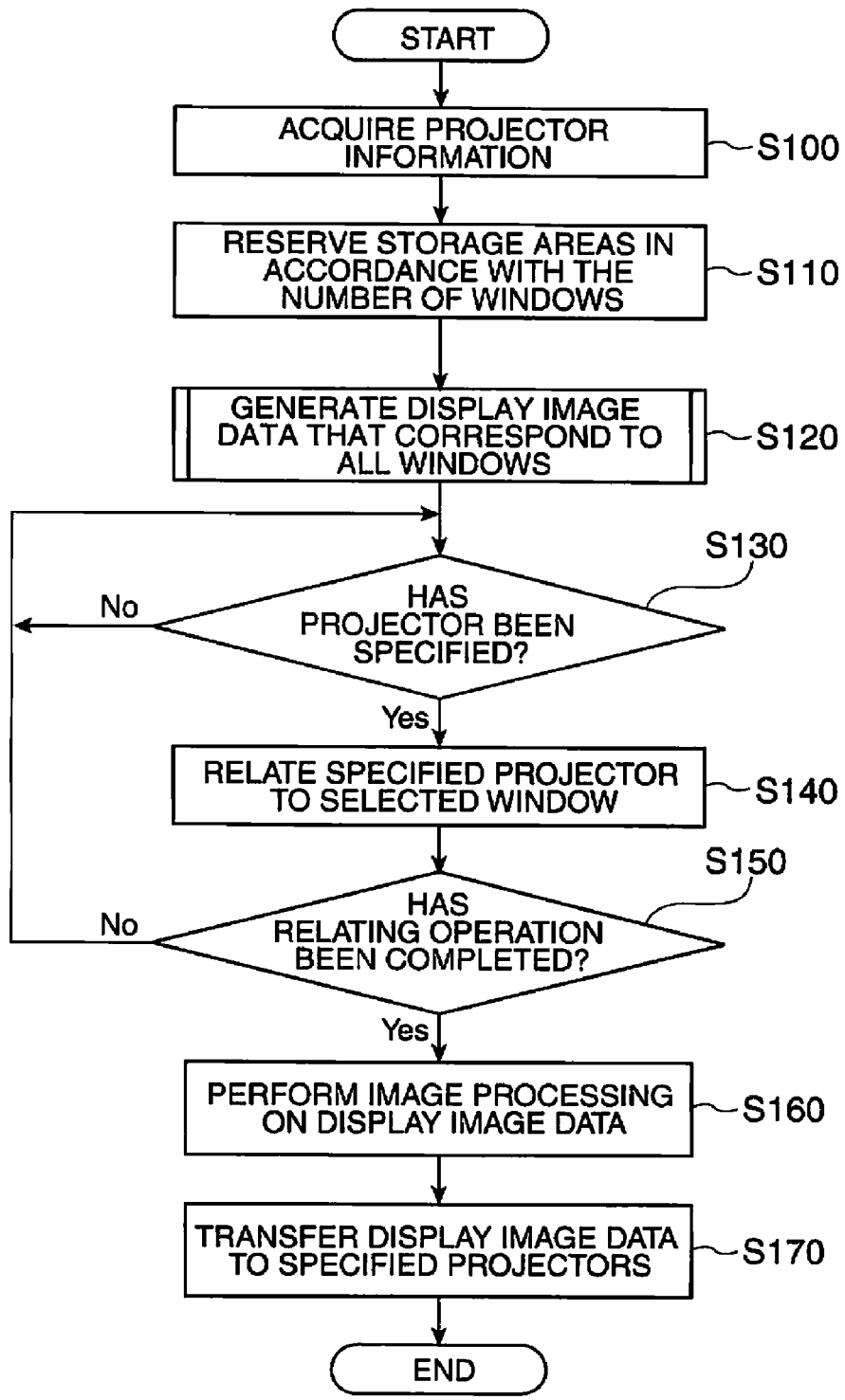
FIG. 4 is a flowchart illustrating process routines executed in an image transfer process carried out by the image transfer apparatus according to at least one embodiment.

Turning now to FIG. 4, and later in the specification to FIGS. 10 and 13, methods of the disclosure, in accordance with various embodiments, are described in terms of firmware, software, and/or hardware with reference to flow charts or diagrams. Describing a method by reference to a flow chart enables one skilled in the art to develop programs, including instructions to carry out the methods on suitably configured computer systems and electronic devices. In various embodiments, portions of the operations to be performed by a computer device system may constitute circuits, general purpose processors (e.g., micro-processors, micro-controllers, an ASIC, or digital signal processors (DSPs)), special purpose processors (e.g., application specific integrated circuits or ASICs), firmware (e.g., firmware that is used by a processor such as a micro-processor, a micro-controller, and/or a digital signal processor), state machines, hardware arrays, reconfigurable hardware, and/or software made up of executable instructions. The executable instructions may be embodied in firmware logic, reconfigurable logic, a hardware description language, a state machine, an application-specific integrated circuit (ASIC), or combinations thereof.

With respect to various embodiments using a software implementation, at least one of the processors of a suitably configured electronic communication device executes the instructions from a storage medium. The computer-executable instructions may be written in a computer programming language or executable code. If written in a programming language conforming to a recognized standard, such instructions may be executed on a variety of hardware platforms and may interface with a variety of operating systems. Although the various embodiments are not described with reference to any particular programming language, it will be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by a device causes the processor of the computer to perform an action or a produce a result.

FIG. 4 is a flowchart illustrating process routines executed in an image transfer process carried out by the image transfer apparatus according to at least one embodiment. FIG. 5 is a descriptive diagram illustrating an example of the screen on the display where a plurality of windows are displayed. FIG. 6 is a descriptive diagram illustrating memory areas in the RAM that stores display image data of each of the windows shown in FIG. 5.

The process routines are initiated, for example, by starting the image transfer application program. The CPU 200 executes the projector information acquiring module M7 to acquire projector information I33 from each projector 30 connected to the image transfer apparatus 20 (step S100). Specifically, the CPU 200 transfers a request to transmit projector information to each of wired and wireless ports and sends a request to transmit projector information to each of the connected projectors 30. In each projector 30 that has received the projector information transmission request, the CPU 300 executes the projector information transmitting module M31, acquires projector information I33 from the ROM 320, and returns the projector information I33 to the image transfer apparatus 20. The CPU 200 that has received the projector information uses the projector information acquired from each projector 30 to store image playback characteristics of the projector 30, such as the supported maximum resolution, color profile, and recognition information, on the HDD 220 along with the fact that the above parameters belong to the projector 30.

The CPU 200 executes the storage control module M3 to reserve storage areas in the RAM 210 in accordance with the number of windows (step S110). For example, Windows® uses a number called a handle to manage each window, and the CPU 200 can acquire the handles of all the windows displayed (opened) on the display 40 by executing an API function "EnumWindows." The CPU 200 therefore reserves a plurality of storage areas necessary to store all the windows in the RAM 210 in accordance with the number of acquired handles. The capacity of each storage area is determined in accordance with the resolution of the desktop screen (primary display) of the display 40.

The CPU 200 executes the display image data generating module M4 to produce (capture) display image data for all the windows displayed on the display 40 (step S120). In the example shown in FIG. 5, the desktop window W1 and three other windows W2 to W4 are displayed on the display 40. Each of the three windows W2 to W4 can be the content provided by an application program. Although part of the window W4 indicated by the broken line lies off the display 40, and the part lying off the display 40 is not displayed thereon, display image data for the entire window W4 including the lying-off part are generated. The lying off occurs in the following two cases: where the position of the window is offset and where the entire window does not fall within the display 40. In the former case, generated display image data can be stored in a single storage area, whereas in the latter case, generated display image are stored across a plurality of storage areas.

For example, when Windows® is used as the operating system, display image data that correspond to all the windows displayed on the display 40 are generated by layering the windows. The CPU 200 layers the windows by using the handles of the windows acquired in advance to sequentially execute the following API functions: an API function "GetWindowLong" for acquiring the current window setting, an API function "SetWindowLong" for registering the current window style acquired in "GetWindowLong" ORed with a layered setting API "WS_EX_LAYERED," and an API function "SetLayeredWindowAttributes" for setting layered parameters for a specified window. For each of the layered windows, the entirety of the window is captured, that is, display image data that correspond to the entire window are generated.

In generating display image data, the display image data generating module M4 expands (draws) display image data on the VRAM 230 based on application program data that correspond to each of the windows. The generated display image data are sequentially transferred to and stored in the storage areas reserved in advance in the RAM 210. In FIG. 6, the display image data for the windows W2, W3, and W1 are stored in a first, second, and third storage areas A1, A2, A3, respectively. The management of the storage areas A1 to A3 is based on coordinates (X, Y), and the storage position of the display image data stored in each of the storage areas, that is, the projection position when projected relative to a projection frame, can be identified by the coordinates. Coordinates can also be used to identify each pixel data that forms display image data.

The CPU 200 executes the projector specifying module M2 and waits until a user specifies projectors 30 (step S130: No). Projectors 30 can be specified, for example, by:

listing all the windows present on the display 40 and relating each of the windows to a projector by using the input device 41, or displaying a projector selecting button on the title bar in each of the windows and specifying a desired projector from a projector selecting menu displayed by pressing the button.

When a projector 30 to which a window is related is specified (step S130: Yes), the CPU 200 executes the storage control module M3 to relate the specified projector 30 to the selected window (step S140). The operation of relating a projector 30 to a window is carried out, for example, by using a relation table shown in FIG. 7. FIG. 7 is a descriptive diagram showing an example of a table that stores the relationship between projectors and windows. The CPU 200 repeatedly executes the steps S130 to S150 until the user completes the operation of relating projectors 30 to windows (step S150: No).

In the example shown in FIGS. 6 and 7, the first, second, and third storage areas A1, A2, A3 are related to first, second, and third projectors PJ1, PJ2, PJ3, respectively. Therefore, the windows W2, W3, and W1 are related to the first, second, and third projectors PJ1, PJ2, PJ3, respectively. The projectors PJ1 to PJ3 can be related to the respective storage areas, for example, by relating the numbers of the ports connected to the projectors PJ1 to PJ3 or the MAC addresses of the projectors PJ1 to PJ3 (communication control modules) to the coordinate information that defines the storage areas.

In at least one embodiment, the storage control module M3 manages the position of a window (display image data) on the display screen with reference to the upper left coordinates in each storage area.

Figures 8, 9:
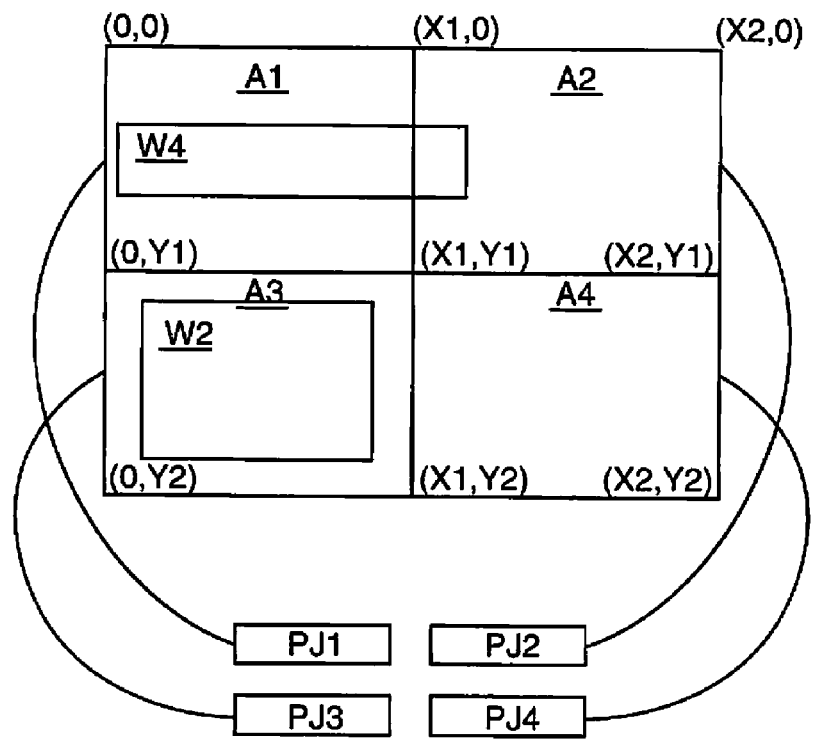
FIG. 8 is a descriptive diagram illustrating memory areas in the RAM that stores display image data of each of the windows shown in FIG. 5.
FIG. 9 is a descriptive diagram illustrating an example of a table that stores the relationship between projectors and windows.

Another example of the operation of relating windows to projectors 30 will be described with reference to FIGS. 8 and 9. FIG. 8 is another descriptive diagram diagrammatically showing memory areas in the RAM that stores display image data of each of the windows shown in FIG. 5. FIG. 9 is a descriptive diagram showing an example of a table that stores the relationship between projectors and windows.

In the example shown in FIG. 5, since the maximum window size of the window W4 is larger than the size of the primary screen (desktop screen), the entire window W4 does not fall within the display 40, and hence part of the window W4 lies off the display screen of the display 40 and is therefore invisible. In general, a window provided by an application program cannot be larger than the maximum size defined by the operating system (OS), typically the size of the primary screen. However, as well known to those skilled in the art, rewriting the contents of the MINMAXINF0 structure allows the window size to be larger than the maximum window size defined by the OS. The example shown in FIG. 5 shows a window having an enlarged size larger than the maximum size of the primary screen by using the above technique. When the entirety of a window is not displayed within the primary screen because the position of the window is shifted, the display image data of the window can be stored in a single storage area and projected through a single projector 30 because the size of the window is within the size (resolution) of the primary screen.

In certain embodiments, for a window at least part of which is displayed on the display 40, display image data representing the entire window may be generated, as described above. However, since the display image data for the window W4 cannot be stored in a single storage area alone having a capacity that corresponds to the resolution of the primary screen, the display image data are stored across the first and second storage areas A1, A2, as shown in FIG. 8. In the example shown in FIGS. 8 and 9, the first, second, third, and fourth storage areas A1, A2, A3, A4 are related to the first, second, third, and fourth projectors PJ1, PJ2, PJ3, PJ4, respectively. Therefore, part of the window W4 stored in the first storage area A1 is related to the first projector PJ1, and another part of the window W4 stored in the second storage area A2 is related to the second projector PJ2. The window W2 stored in the third storage area A3 is related to the third projector PJ3.

In at least one embodiment, each storage area is reserved in such a way that its vertical or horizontal side is in full contact with an adjacent storage area, that is, seamlessly connected therewith, and hence a plurality of adjacent storage areas can form a single imaginary storage area for storing display image data that correspond to a single window. Further, since the arrangement of the reserved storage areas corresponds to the arrangement of the projectors PJ1 to PJ4, an image can be projected in the way the display image data are expanded on the storage areas. That is, the display image data for the window W4 stored in the first storage area A1 is projected by the first projector PJ1, and the display image data for the window W4 stored in the second storage area A2 is projected by the second projector PJ2. Therefore, the image of the entire window W4, which cannot be displayed through a single projector 30, can be projected as a single image on a projection surface by the two projectors PJ1 and PJ2. Since the management of each storage area is based on coordinate information, the image of the entire window W4 can be projected even when the storage area that stores part of the window W4 is not adjacent to the storage area that stores the remainder of the window W4 by transferring the display image data that corresponds to part of the window W4 and the display image data that corresponds to the remainder of the window W4 to respective projectors 30 disposed adjacent to each other.

When the user completes the operation of relating projectors 30 to windows (step S150: Yes), the CPU 200 executes the image processing module M5 to perform image processing as required on the display image data stored in each storage area (step S160). For example, the projector information is used to perform image quality adjustment processes, such as resolution conversion, sharpness, brightness adjustment, and color balance.

The CPU 200 executes the communication control module M6 to transfer the display image data that have undergone the image processing to the corresponding projectors 30 (PJ1 to PJ4) (step S170). The present process routines are then terminated. After the operation of relating windows to projectors 30 has been completed, generation of display image data of the windows on the display 40 and transmission of the display image data to the projectors 30 (PJ1 to PJ4) are repeatedly carried out at predetermined timings. Alternatively, for content that does not change with time, generation of display image data of a window and transmission of the display image data to any of the projectors 30 (PJ1 to PJ4) may be carried out when the window becomes active. In this way, an image that corresponds to the latest window can be always projected after windows are related to projectors 30.

As described above, in the image transfer apparatus 20, according to at least one embodiment, since display image data for a plurality of windows displayed on the display 40 are stored in such a way that the plurality of windows are related to projectors 30, the display screens of the plurality of windows displayed on the display 40 can be respectively transferred to a plurality of projectors 30. Therefore, the single image transfer apparatus 20 can be used to project a plurality of windows separately through a plurality of projectors 30. As a result, the user can project a desired window through a desired projector. It is therefore possible to improve the degree of freedom of projector-based image projection.

In the image transfer apparatus 20, according to at least one embodiment, even for a window part of which is displayed on the display 40, display image data for the entire window are generated. Therefore, the image of the entire window can be projected by transferring the display image data for part of the window displayed on the display 40 and the display image data for the remainder of the window that is not displayed on the display 40 to a plurality of projectors arranged adjacent to each other. That is, it is possible to project the image of the entirety of a single window including the display image of the part that lies off the display 40, which cannot be projected by the technology of related art.

Further, in the image transfer apparatus 20, according to certain embodiments, the user can select only a desired window and project it through a projector 30. Therefore, in a presentation, for example, the user can present to the audience only a window that the user wants to project among the windows displayed on the display 40. Therefore, the user can concurrently perform other tasks on the display 40, and such operation improves the efficiency and the appearance of the presentation.

Moreover, in the image transfer apparatus 20, according to certain embodiments, a plurality of windows can be transferred to a plurality of projectors 30 and then projected through the projectors 30 without installing any driver software dedicated to each of the projectors 30 in the personal computer or other apparatus.

In a further embodiment, in addition to the storage area for storing generated display image data, a projector transfer storage area for transferring the display image data to each projector 30 is reserved in the RAM 210. The process steps in the image transfer process in the further embodiments are similar to those in the image transfer process in previous embodiments. As such, no detailed description of the process steps will be made.

Figure 10:
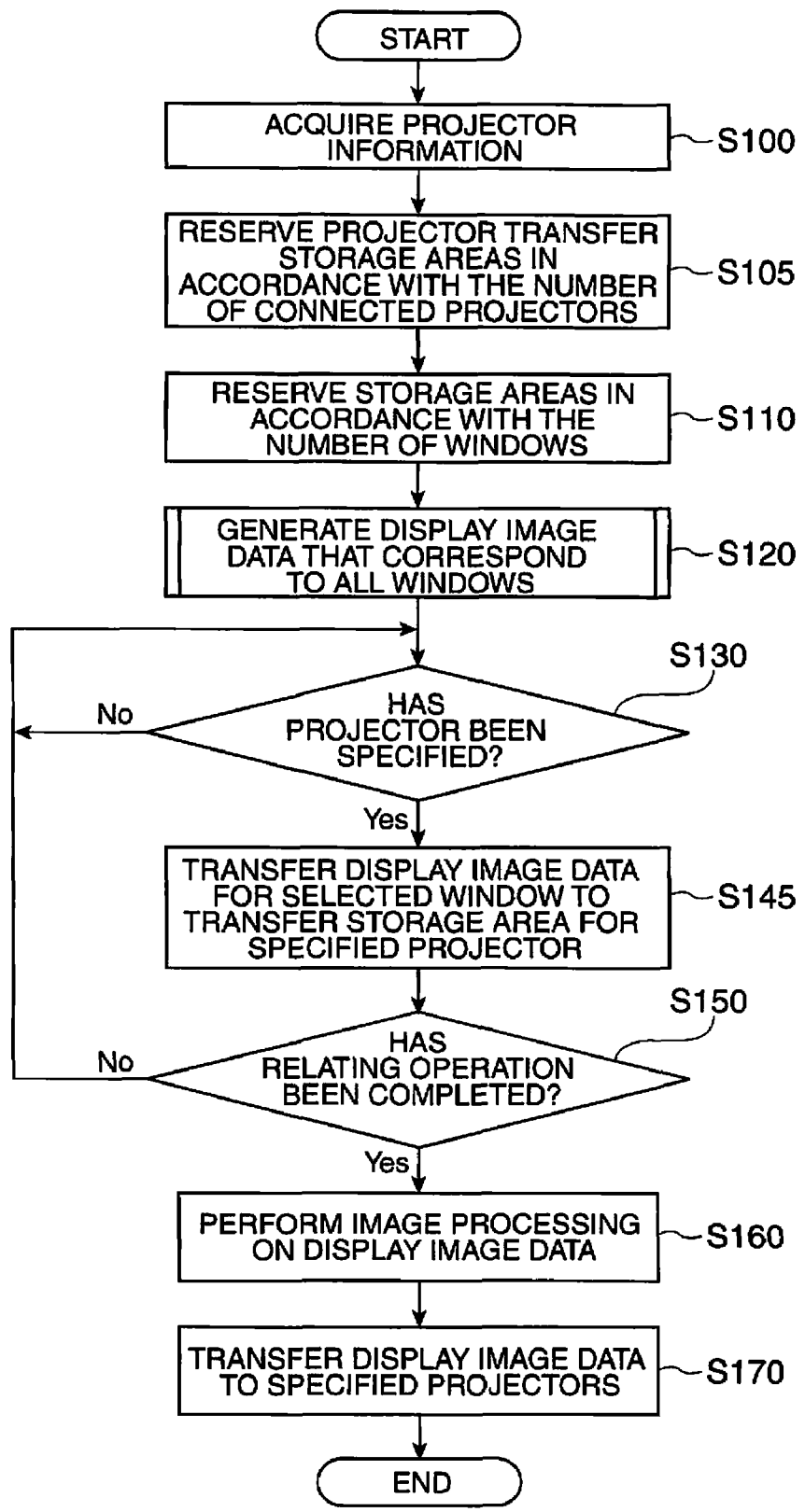
FIG. 10 is a flowchart illustrating process routines executed in an image transfer process carried out by an image transfer apparatus according to at least one embodiment.
Figures 11, 12:
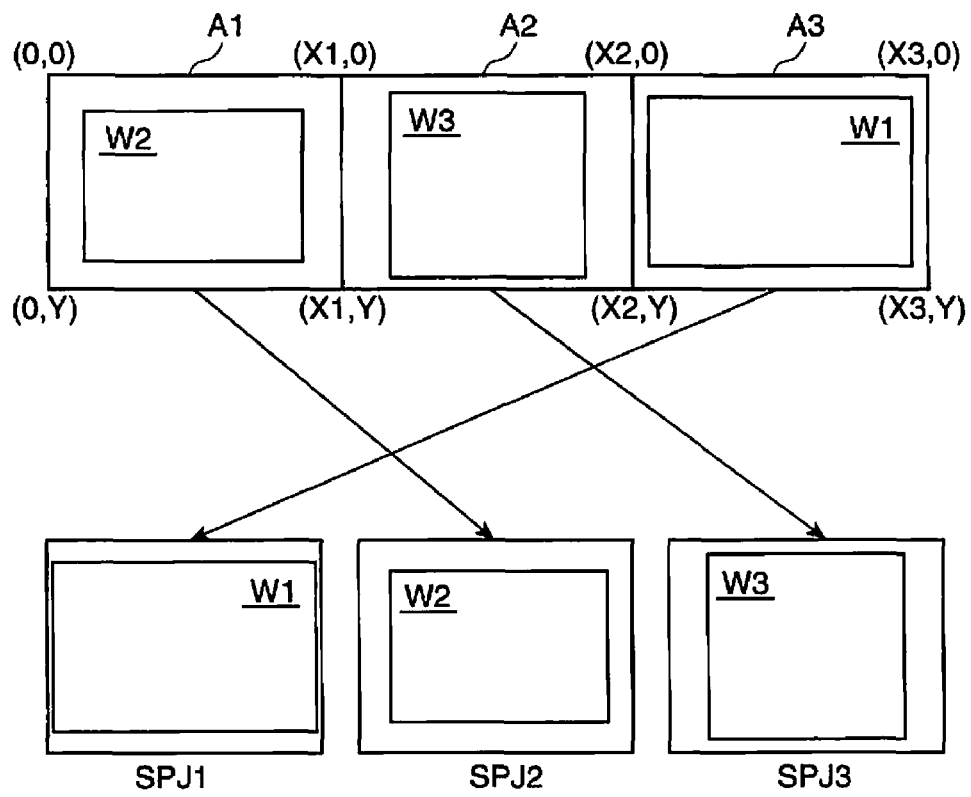
FIG. 11 is a descriptive diagram illustrating an example of the relationship between storage areas that store display image data and projector transfer storage areas.
FIG. 12 is a descriptive diagram illustrating an example of a table representing the relationship among the storage areas that store display image data, the projector transfer storage areas, and windows.

FIG. 10 is a flowchart illustrating process routines executed in the image transfer process carried out by the image transfer apparatus according to the second embodiment. FIG. 11 is a descriptive diagram illustrating an example of the relationship between storage areas A1 to A3 that store display image data and projector transfer storage areas SPJ1 to SPJ3. FIG. 12 is a descriptive diagram illustrating an example of a table representing the relationship among the storage areas A1 to A3 that store display image data, the projector transfer storage areas SPJ1 to SPJ3, and windows W1 to W3.

The process routines are initiated, for example, by starting the image transfer application program. The CPU 200 executes the projector information acquiring module M7 to acquire the projector information I33 from each projector 30 connected to the image transfer apparatus 20 (step S100). The connected projector managing module M8 is executed to identify the number of projectors 30 connected to the input/output interface 240, and the storage control module M3 is executed to reserve projector transfer storage areas in the RAM 210 or on the HDD 220 in accordance with the number of connected projectors 30 (step S105). The number of projectors 30 is identified, for example, by detecting the number of wired and wireless ports to which the projectors 30 are connected based on the detection of the change in voltage at detection power supply terminals in USB terminals and the detection of established connection in wireless communication. The projector transfer storage areas SPJ1 to SPJ3 are not necessarily seamlessly connected to each other unlike the storage areas A1 to A3 that store display image data. Each of the reserved projector transfer storage areas SPJ1 to SPJ3 has a capacity that corresponds to the resolution of the primary display of the display 40.

The CPU 200 executes the steps S110 to S130 as described above. When a projector 30 is specified (step S130: Yes), the CPU 200 executes an operation of relating a selected window to the specified projector (step S145). Specifically, the CPU 200 executes the storage control module M3 to relate the storage area that stores display image data that corresponds to the selected window to the projector transfer storage area that corresponds to the specified projector. The operation of relating selected windows to specified projectors is carried out until the user inputs a relating operation termination input through the input device 41, or all the windows are related to projectors, or all the projectors are related to windows (step S150: No).

In the example shown in FIGS. 11 and 12, display image data for the windows W2, W3, and W1 are stored in the first, second, and third storage areas A1, A2, A3 that store display image data, respectively. First, second, and third projectors PJ1, PJ2, PJ3 are related to the windows W1, W2, and W3, respectively.

The CPU 200 executes the storage control module M3 to copy or move the display image data for the window W1 stored in the third storage area A3 to the projector transfer storage area SPJ1, which is the transfer storage area for the first projector PJ1. Similarly, the display image data for the window W2 stored in the first storage area A1 are copied or moved to the projector transfer storage area SPJ2, and the display image data for the window W3 stored in the second storage area A2 are copied or moved to the projector transfer storage area SPJ3.

When the operation of relating selected windows to specified projectors is completed (step S150: Yes), the CPU 200 executes the image processing module M5 to perform image processing on the display image data (step S160). In the present embodiment, the image processing on the display image data is performed in the projector transfer storage areas SPJ1 to SPJ3. The image processing performed in the second embodiment includes display image data combination as well as the image processing described in the first embodiment. Such a combination operation allows display image data arranged in the way they are displayed on the display 40 to be transferred to a projector 30 when a request to project a plurality of windows through a single projector is issued.

The CPU 200 transfers the display image data that have undergone the image processing and are stored in the projector transfer storage areas SPJ1 to SPJ3 to the corresponding projectors PJ1 to PJ3, and terminates the present process routines.

In the image transfer apparatus 20 according to the second embodiment, in addition to the advantage provided by the image transfer apparatus 20 according to the first embodiment, captured display image data can be held as they are, and at the same time, image processing can be performed on the display image data to be transferred to projectors 30. That is, since the image transfer apparatus 20 according to the second embodiment has two types of storage areas, storage areas for storing display image data and the projector transfer storage areas, performing image processing in the projector transfer storage areas allows the display image data that has undergone the image processing to be transferred to projectors 30 with the original display image data unchanged.

In the image transfer apparatus 20, according to at least one embodiment, the primary display on the display 40 can be readily projected in the way the primary display looks. That is, in certain embodiments, since the display image data for each window is separately generated, the display image data containing all the windows may be obtained by the combination operation. In certain embodiments, the projector transfer storage areas may be used to readily combine display image data corresponding to the windows and stored in the storage areas for storing display image data.

In a further embodiment, the storage area for storing display image data is reserved in the RAM 210 in accordance with the number of connected projectors, whereas, in previous embodiments, the storage area for storing display image data may be reserved in the RAM 210 in accordance with the number of windows.

Since the configuration of the image transfer apparatus 20 remains unchanged, the same reference characters as those used in previous embodiments are used and the description of the configuration will be omitted. Also, the image transfer process is similar to the image transfer process described in previous embodiments. As such, no detailed description will be made of the process steps in the image transfer process.

Figure 13:
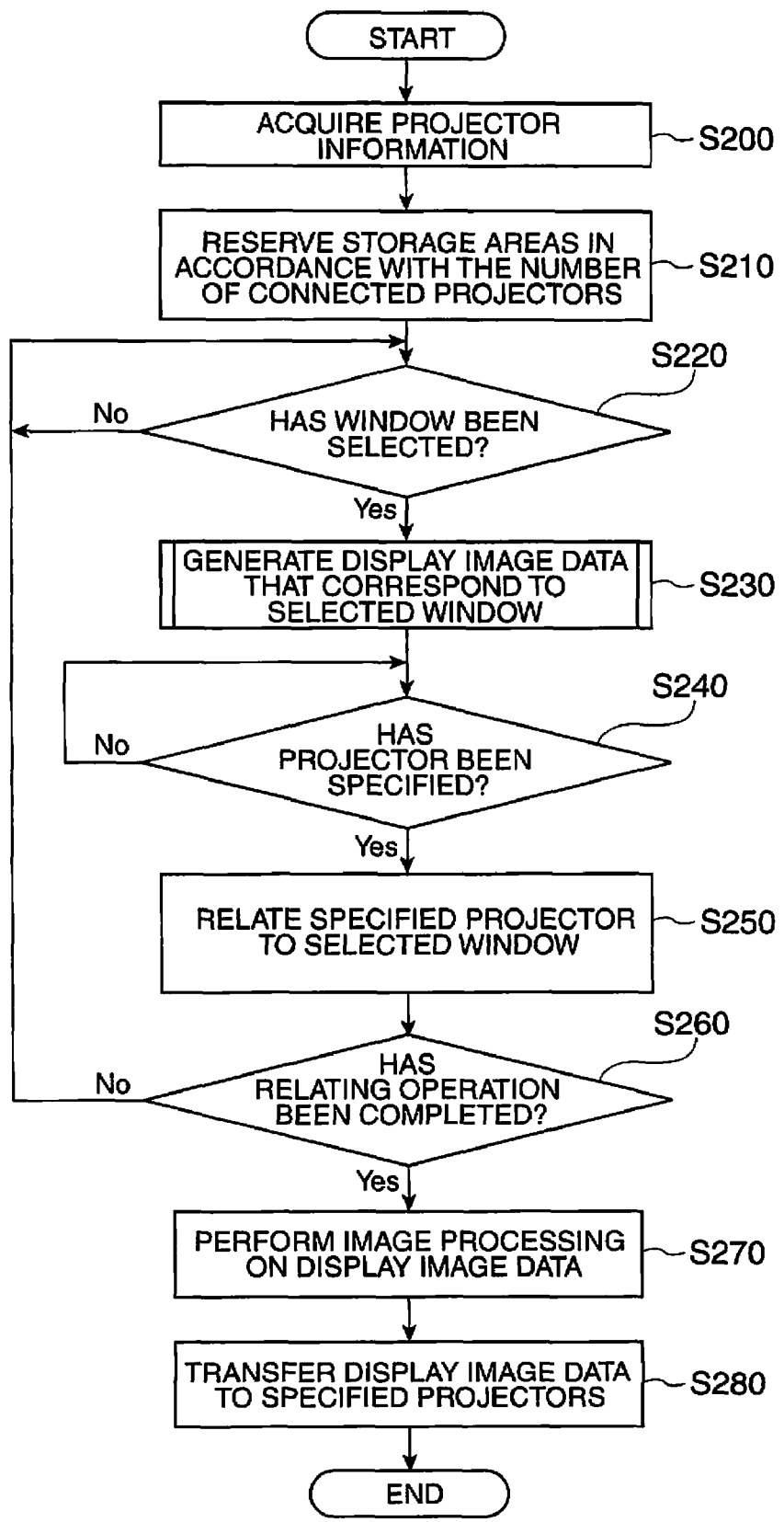
FIG. 13 is a flowchart illustrating process routines executed in an image transfer process carried out by an image transfer apparatus according to at least one embodiment.

FIG. 13 is a flowchart illustrating process routines executed in the image transfer process carried out by the image transfer apparatus according to at least one embodiment. The process routines are initiated, for example, by starting the image transfer application program. The CPU 200 executes the projector information acquiring module M7 to acquire the projector information I33 from each projector 30 connected to the image transfer apparatus 20 (step S200).

The connected projector managing module M8 is executed to identify the number of projectors 30 connected to the input/output interface 240, and the storage control module M3 is executed to reserve display image data storage areas in the RAM 210 or on the HDD 220 in accordance with the number of connected projectors 30 (step S210). The number of projectors 30 is identified, for example, by detecting the number of wired and wireless ports to which the projectors 30 are connected based on the detection of the change in voltage at detection power supply terminals in USB terminals and the detection of established connection in wireless communication.

The CPU 200 waits until any of a plurality windows displayed on the display 40 is selected through the input device 41 (step S220: No). A window is selected, for example, by using a mouse to select (click the left button, for example) a desired window (content) or moving the mouse cursor onto a desired window.

When the user selects a window through the input device 41 (step S220: Yes), the CPU 200 generates display image data that corresponds to the selected window (step S230). That is, the CPU 200 executes the display image data generating module M4 to generate (capture) display image data for the selected window image. The process is carried out, for example, by holding the display image data to be displayed on the display 40 in the VRAM 230 and drawing the display image data for the selected window in the remaining memory area in the VRAM 230.

The CPU 200 waits until a projector 30 for projecting the selected window is specified (step S240: No). When a projector 30 is specified (step S240: Yes), the CPU 200 carries out an operation of relating the specified projector 30 to the selected window (step S250). The projector 30 may be specified, for example, by specifying any of those in a projector list displayed by clicking the right button of the mouse on the selected window, or preparing a button for displaying projector specifying list in the title bar in each window and specifying any of those in a projector list displayed when the button is pressed.

The operation of relating the specified projector 30 to the selected window is carried out by instructing the CPU 200 to execute the storage control module M3. Specifically, the operation is carried out by transferring the display image data for the selected window drawn in the VRAM 230 under the control of the display image data generating module M4 to the reserved storage area in the RAM 210 that corresponds to the specified projector 30. After the relating operation, the display image data that corresponds to the selected window in the VRAM 230 is deleted.

The CPU 200 repeatedly carries out the processes in the steps S220 to S250 until the operation of relating specified projectors 30 to selected windows is completed (step S260: No). Therefore, the generation of the display image data for a selected window and the transfer of the generated display image data to the corresponding storage area in the RAM 210 are repeatedly carried out.

When the operation of relating specified projectors 30 to selected windows is completed (step S260: Yes), the CPU 200 executes the image processing module M5, as described above (step S270). Image processing performed on the display image data by the image processing module M5 is carried out in each of the storage areas in the RAM 210.

The CPU 200 executes the communication control module M6 to transfer the display image data stored in each of the storage areas in the RAM 210 to the corresponding projector 30 (step S280), and then terminates the present process routines.

In the image transfer apparatus 20, according to at least one embodiment described above, in addition to the advantage provided by the image transfer apparatus 20, according to certain embodiments, the capacity of each storage area that stores display image data can be advantageously reduced. That is, in at lest one embodiment, since display image data is generated for a selected window at a time, display image data that correspond to unselected windows may not be generated. Further, in certain embodiments, since display image data is generated only for a window to be transferred to a projector 30 and the storage area is freed after the transfer, the capacity of the storage area can be reduced. When the same window needs to be captured, the display image data for the window may be generated again.

In certain embodiments described above, the generated display image data may be repeatedly updated at predetermined timings. Such updating allows the image projected through a projector 30 to be consistent with the window on the display 40. Alternatively, the display image data may be generated (captured) whenever a window becomes active. In this example, no unnecessary operation of updating display image data will be performed. The updating time intervals for a window or content involving moving images may be smaller than those in other content, or only differential data may be transferred to reduce the amount of data transfer.

In certain embodiments described above, when the size of a window on the display 40 is changed, display image data for the window whose size has been changed is generated at the next capturing timing and transferred to a projector 30. On the other hand, when only the position of a window on the display 40 is changed, the coordinates of the display image data in the storage area may not be changed from the initial coordinates (pasted position). In this way, on the display 40 on which a plurality of windows are displayed, even when a window is moved to perform some kind of processing on another window, the projection position of the window projected through a projector 30 is not changed. It is therefore possible to prevent or suppress unnecessary shift of the projected window.

In certain embodiments described above, when the same window is transferred to a plurality of projectors 30, a single projector transfer storage area may be related to the plurality of projectors 30. In this case, resources necessary for the projector transfer storage areas can be reduced.

In certain embodiments described above, when the capacity of the display image data storage area for a window or a projector 30 or the capacity of the projector transfer storage area is insufficient, the storage area to be reserved may have a capacity that corresponds to a resolution lower than the resolution of the primary display, or the storage area to be reserved may have a capacity that corresponds to the resolution of the primary display until a capacity shortage occurs. In the former case, display image data with a converted resolution may be stored, and in the latter case, display image data to be stored in each storage area may be successively switched. Further, when a projector 30 is not adapted to (does not support) the resolution of the primary display, the storage area to be reserved may have a capacity according to the resolution of the projector 30 while the aspect ratio of the primary display is maintained. In this case, since the image transfer apparatus 20 stores display image data in each storage area after the resolution of the display image data is converted into the resolution that the projector 30 supports, it is possible to efficiently use the storage area and transfer display image data having a resolution supported by the projector 30 to the projector 30. Information on the resolution of a projector 30 is stored in the projector 30 as the projector information I33, and the image transfer apparatus 20 can obtain information on the resolution that the projector 20 supports by acquiring the projector information I33.

In certain embodiments described above, while the description has been made with reference to a projector as the image projection apparatus 30, for example, a projection-type display monitor may be used. Further, the image projection apparatus may be replaced with a typical display. In this case as well, different windows can be displayed on a plurality of displays.

In certain embodiments described above, the image transfer process is accomplished by software. Alternatively, the image transfer process may be accomplished by hardware. In this case, the hardware may be, for example, a substrate with a logic circuit for performing the image transfer process or a substrate with the logic circuit and a storage device.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. An image transfer apparatus configured for connection to a plurality of image projection apparatuses, the image transfer apparatus comprising:
   a display configured to display multiple sets of content within a display region;
   a display image data generator configured to generate a set of display image data associated with each set of content, wherein at least part of each set of content is displayed on the display;
   a storage device;
   a storage controller configured to:
      relate the connected image projection apparatuses to the generated sets of display image data such that each set of display image data is associated with at least one corresponding image projection apparatus, each set of display image data identifying a position for displaying the associated set of content within a projected image displayed by the at least one corresponding image projection apparatus, and
      store the sets of display image data related to the image projection apparatuses in the storage device; and
   a transfer unit configured to transfer the sets of display image data to the corresponding image projection apparatuses,
   wherein the storage controller is configured such that when one set of content of the multiple sets of content is moved within the display region of the display relative to at least one other set of content of the multiple sets of content, the position identified by the associated set of display image data for displaying the one set of content within the projected image displayed by the corresponding image projection apparatus remains unchanged.

2. The image transfer apparatus according to claim 1, further comprising:
a selector configured to select any one of the multiple sets of content displayed on the display; and
a specifying unit configured to specify the image projection apparatus for projecting the selected set of content.

3. The image transfer apparatus according to claim 2, wherein the storage controller is configured to relate the selected set of display image data associated with the selected set of content to the specified image projection apparatus and store the set of display image data related to the specified image projection apparatus in the storage device.

4. The image transfer apparatus according to claim 1, wherein the storage controller reserves storage areas for storing the sets of display image data in the storage device in accordance with the number of sets of content displayed on the display.

5. The image transfer apparatus according to claim 4, further comprising:
an image processor configured to perform image processing on the sets of display image data in the display image data storage areas according to the number of sets of content.

6. The image transfer apparatus according to claim 4, wherein the storage controller reserves the storage areas in the storage device in accordance with a resolution of the display.

7. The image transfer apparatus according to claim 4, wherein the storage controller reserves the storage areas in the storage device in accordance with a resolution of the image projection apparatuses.

8. The image transfer apparatus according to claim 4, wherein:
the storage areas are reserved in accordance with an arrangement of the connected image projection apparatuses, and
the storage controller stores one of the sets of display image data in a plurality of storage areas corresponding to the image projection apparatuses adjacent to each other when an amount of data in the one set of display image data is larger than a capacity of any one of the storage areas.

9. The image transfer apparatus according to claim 1, wherein the storage controller reserves storage areas for storing the sets of display image data in the storage device in accordance with the number of connected image projection apparatuses.

10. The image transfer apparatus according to claim 9, further comprising an image processor configured to perform image processing on the sets of display image data in the display image data storage areas according to the number of image projection apparatuses.

11. The image transfer apparatus according to claim 9, further comprising a management unit configured to manage information on the connected image projection apparatuses.

12. The image transfer apparatus according to claim 11, wherein the storage controller acquires information on the number of the connected image projection apparatuses from the management unit.

13. An image transfer method comprising:
connecting to a plurality of image projection apparatuses;
generating a set of display image data for associated with each of multiple sets of content, the multiple sets of content being displayed within a display region, wherein at least part of each set of content is displayed on a display;
relating the connected image projection apparatuses to the generated sets of display image data such that each set of display image data is associated with at least one corresponding image projection apparatus, each set of display image data identifying a position for displaying the associated set of content within a projected image displayed by the at least one corresponding image projection apparatus;
storing the sets of display image data related to the image projection apparatuses in a storage device; and
transferring the sets of display image data to the corresponding image projection apparatuses,
wherein, when one set of content of the multiple sets of content is moved within the display region of the display relative to at least one other set of content of the multiple sets of content, the position identified by the associated set of display image data for displaying the one set of content within the projected image displayed by the corresponding image projection apparatus remains unchanged.

14. The image transfer method of claim 13, wherein the generating a set of display image data associated with each of multiple sets of content further comprises generating a set of display image data associated with a selected set of content, the selected set of content being displayed on the display.

15. The image transfer method of claim 13, wherein the relating the connected image projection apparatuses to the generated sets of display image data further comprises:
acquiring image projection apparatus information; and
specifying the image projection apparatuses for displaying the generated sets of display image data.

16. The image transfer method of claim 13, wherein the storing the sets of display image data further comprises at least one of:
reserving a plurality of storage areas, wherein each storage area is associated with each set of display image data;
reserving a plurality of storage areas, wherein each storage area is associated with each image projection apparatus; and
transferring display image data to the reserved storage areas.

17. The image transfer method of claim 13, wherein the transferring the set of display image data to the corresponding image projection apparatuses further comprises performing image processing on the sets of display image data.

* * * * *